US012617733B2

(12) United States Patent
Füssel et al.

(10) Patent No.: US 12,617,733 B2
(45) Date of Patent: May 5, 2026

(54) METHOD FOR PRODUCING A POROUS METALLIC OR CERAMIC COMPONENT AND COMPONENT PRODUCED USING THE METHOD

(71) Applicants: Fraunhofer-Gesellschaft zur Förderung der Angewandten Forschung E.V., Munich (DE); Hollomet GmbH, Dresden (DE)

(72) Inventors: Alexander Füssel, Dresden (DE); Gisela Standke, Dresden (DE); Daniela Haase, Dresden (DE); Jörg Adler, Dresden (DE); Ulf Waag, Bad Säckingen (DE)

(73) Assignees: Fraunhofer-Gesellschaft zur Förderung der Angewandten Forschung E.V., Munich (DE); Hollomet GmbH, Dresden (DE)

( * ) Notice: Subject to any disclaimer, the term of this patent is extended or adjusted under 35 U.S.C. 154(b) by 278 days.

(21) Appl. No.: 18/559,902

(22) PCT Filed: May 10, 2022

(86) PCT No.: PCT/EP2022/062633
§ 371 (c)(1),
(2) Date: Nov. 9, 2023

(87) PCT Pub. No.: WO2022/238399
PCT Pub. Date: Nov. 17, 2022

(65) Prior Publication Data
US 2025/0002419 A1      Jan. 2, 2025

(30) Foreign Application Priority Data
May 11, 2021      (DE) ..................... 10 2021 204 741.6

(51) Int. Cl.
*C04B 41/50*          (2006.01)
*C04B 41/45*          (2006.01)

(52) U.S. Cl.
CPC .......... *C04B 41/50* (2013.01); *C04B 41/4531* (2013.01)

(58) Field of Classification Search
CPC ...... C04B 41/50; C04B 41/4531; B22F 5/003
See application file for complete search history.

(56) References Cited

U.S. PATENT DOCUMENTS

| 3,090,094 A | 5/1963 | Schwartzwalder et al. |
| 3,111,396 A | 11/1963 | Ball |

| 6,635,339 B1 * | 10/2003 | Adler ................... C04B 41/009 |
| | | 427/244 |
| 9,833,775 B2 * | 12/2017 | Waag ..................... B22F 5/003 |
| 2004/0183055 A1 | 9/2004 | Chartier et al. |

FOREIGN PATENT DOCUMENTS

| CN | 108096639 A | 6/2018 |
| CN | 111233478 A | 6/2020 |
| DE | 102008054596 A1 | 6/2010 |
| DE | 102010039322 A1 | 2/2012 |
| DE | 102017216569 A1 | 3/2019 |
| EP | 2123618 A1 | 11/2009 |
| JP | 2007151805 A | 6/2007 |
| JP | 2013037985 A | 2/2013 |
| JP | 2020534433 A | 11/2020 |
| JP | 2020534434 A | 11/2020 |
| KR | 101780899 B1 | 9/2017 |
| WO | 2020161898 A1 | 8/2020 |

OTHER PUBLICATIONS

Japan Patent Office, Office Action in Application No. JP 2023-570101, dated Feb. 12, 2025, 7 pages.
European Patent Office, German Exam Report in Application No. DE10 2021 204 741.6, dated Feb. 14, 2022, 9 pages.
European Patent Office, International Search Report and Written Opinion in Application No. PCT/EP2022/062633, dated Aug. 26, 2022, 19 pages, Rijswijk, Netherlands.
Xiong Yin-Ze, et al. "rationally designed functionally graded porous Ti6A14V scaffolds with high strength and toughness built via selective laster melting for load-bearing orthopedic applications" Journal of the Mechanical Behavior of Biomedical Materials, vol. 104, Apr. 1, 2020, p. 103673, Amsterdam, NL.
Lazinska Magda, et al., "Porous graded FeAl intermetallic forms fabricated by sintering process using NaCl space holders" Materials Science, vol. 636, Mar. 18, 2015, pp. 407-414.

* cited by examiner

*Primary Examiner* — Michael P Wieczorek
(74) *Attorney, Agent, or Firm* — Marshall & Melhorn, LLC

(57)          ABSTRACT

An open-pored polymeric foam body is provided with a metallic coating or a coating at the surfaces of struts of the foam body. At the semi-finished product, a suspension that is formed with metallic or ceramic particles, in which additionally gas bubbles are present, is brought in contact with the surface of the foam body in surface regions and is brought into a predefined shape. A portion of this suspension penetrates into open pores of the foam body. Thereafter, a thermal treatment is carried out, during which liquid is expelled, polymeric components are removed, and subsequently a sintering process is carried out. A first volume region is formed with the metal or the ceramic originating from the suspension, which has a smaller porosity. Adjoining this first volume region, a second volume region is created, which is likewise porous.

14 Claims, No Drawings

METHOD FOR PRODUCING A POROUS METALLIC OR CERAMIC COMPONENT AND COMPONENT PRODUCED USING THE METHOD

FIELD

The invention relates to a method for producing a porous metallic or ceramic component and to a method produced using the method. Porous components are employed in a wide variety of technical areas. They are used for filtering or for receiving solid or liquid media, but also as heat exchangers. Frequently, they are also used as insulators or damping elements. In many applications, an open-pored structure is desirable. The open porosity, however, results in losses of strength and stability, making it necessary for many applications to use supporting, separate frame structures that, even though these ensure greater strength, cannot be reconciled, or can only be reconciled with great difficulty, with sufficient lasting strength with an open-pored foam body.

BACKGROUND

In addition, it is problematic to create connection options to open-pored bodies which, for example, allow electrical contacting for supplying electrical energy or allow a medium, in particular a fluid, to be supplied and/or removed, as is necessary, for example, in the case of electrical heating elements or heat exchangers.

It is known to connect an open-pored foam body to a frame or other elements in a form-locked manner. However, problems arise with a permanent joint since struts in the connecting region may break due to mechanical stresses. These problems, however, also cannot be sufficiently taken into consideration when using a single or additional integral joint. Weak spots or interfaces that may result in the breakage of the joint occur at the joining points as a result of welding, soldering or bonding.

SUMMARY

It is therefore the object of the invention to provide options by way of which the stability of open-pored components is increased and/or to provide connecting options to an open-pored structure by way of which a secure and permanent supply or removal of media or energy can be achieved.

This object is achieved according to the invention by a method having the features of the claims. The claims define an accordingly produced component. Advantageous embodiments and refinements of the invention can be implemented with features set out in the dependent claims.

DETAILED DESCRIPTION

When the open-pored metallic and/or ceramic components in question are produced, comprising at least three mutually adjoining volume regions having differing porosities, the procedure is such that first a semi-finished product is prepared in the manner known per se, which has an open-pored structure that is with an open-pored foam body made of a polymeric material. At the surfaces of struts of the foam body, the polymeric material has been provided with a metallic coating or a coating formed with metallic or ceramic particles in such a way that an open-pored base structure has been preserved. This can be achieved, for example, by way of a CVD or PVD method, which is known per se, galvanically or according to the so-called Schwartzwalder process, in which the struts have been provided with a coating containing metallic or ceramic particles. A semi-finished product obtained by way of the Schwartzwalder process should be dried prior to further processing to such an extent that sufficient green strength has been achieved. The corresponding known procedure is described in U.S. Pat. No. 3,090,094 B or U.S. Pat. No. 3,111,396 B, for example.

Preferably, a cut-out from a reticulated open-cell polyurethane foam is used as the open-pored foam body that is formed of a polymeric material. For this purpose, the cell size used can cover the entire range of reticulated foams commercially classified according to pores per inch (according to ASTM D3576-77) from 8 ppi to 100 ppi, but it is advantageous when coarser foams in the range of 8 ppi to 30 ppi are used. A conversion of the ppi values into pore sizes in mm is easily possibly using photooptical or computer tomography methods.

However, it is also possible to use other open-pored structures that are formed of polymers, for example nonwoven fabrics or lattice structures produced by means of additive processes.

A suspension, which is formed with metallic or ceramic particles, a liquid and a polymeric binder and in which gas bubbles that were previously formed in the suspension are additionally present, is brought in contact with a surface of the foam body and is then brought into a predefined shape at predefined surface regions on a semi-finished product thus obtained. In the process, a portion of this suspension penetrates into open pores of the foam body, serving as the semi-finished product, in an edge layer region.

Thereafter, a drying process using a thermal treatment is carried out, during which first liquid contained in the suspension is expelled, and thereafter or simultaneously polymeric components, in particular polymeric components of the binder and the polymeric material of the foam body, are removed, and subsequently a sintering process is carried out.

During sintering, a first volume region is formed with the metal or the ceramic material originating from the suspension, which has a smaller porosity than the porosity of the semi-finished product which was exclusively obtained as a result of the gas bubbles present in the suspension, and, adjoining this first volume region, a second volume region is formed, which likewise is or can be porous, and the second volume region has been formed with the metal or ceramic from the coating of the struts of the semi-finished product and the metal or the ceramic of the suspension, wherein these metals and/or ceramics are joined to one another integrally and in a form-locked manner within the second volume region. As a result, the second volume region joins the first volume region to the metallic or ceramic open-pored structure of the open-pored third volume region obtained from the coated foam body, which has a larger porosity than the first volume region, in an edge layer region of the third volume region which forms the second volume region.

The suspension with which the first and second volume regions of the component are created can be produced in the manner known per se. For this purpose, a suitable liquid can be used, comprising at least one polymeric binder and a proportion of metallic or ceramic powdery solid. Gas bubbles can be intercalated into the suspension by mechanical stirring or using another method, for example a procedure as is known from DE 10 2010 039 322 A1. In addition to air, it is also possible to use other gases or gas mixtures, which can also exhibit inert action, so that no disadvantageous influence on the particular metal or the particular ceramic with which the component was ultimately formed is observed.

Usually, binders that are already utilized for such suspensions, such as polyvinyl alcohols, can be employed as polymeric binding agents. In any case, defoamers should be dispensed with. Preferably, water can be used as the liquid. However, other liquids, which preferably have a lower boiling temperature than water, are also suitable.

Preferably, a suspension having a viscosity of at least 0.1 mPas should be used for creating the first and second volume regions. The suspension should preferably furthermore have a shear-thinning flow behavior, with a distinct flow limit. Either alone or in addition, gas bubbles should be present in the suspension with a volume percentage of at least 5% up to a maximum of 50% of the total volume of the suspension.

Advantageously, the struts of the semi-finished product should be coated with the same metal or the same ceramic which was used to form the suspension for creating the first and second volume regions. This may be a pure metal of a chemical element, or corresponding alloys. If alloys are used, the alloy composition of the coating of the semi-finished product can deviate from the alloy composition of the particles that are used for the suspension.

However, it is also possible to use different materials for the coating of the struts of the semi-finished product and for the suspension for creating the first and second volume regions. The coefficients of expansion of the materials should be in a similar order of magnitude, and the thermal behavior as a function of the sintering temperature should be similar. This is the case, for example, when using stainless steel and zirconium oxide ceramics. In this connection, the term 'similar' shall be understood to mean deviations of less than 10% from one another. A second volume region can be formed with metal and ceramic materials in combination when the sintering temperatures and thermal coefficients of expansion of the different materials make this possible.

The suspension for creating the first and second volume regions can be added into at least one recess, depression, or perforation that is formed at the semifinished product, and/or into the interior of a molding tool that can be attached to the particular semi-finished product, before the thermal treatment is carried out, during which the component can ultimately be finished. For example, certain surface or edge layer regions of the particular component can thus be reinforced, or connections can be created there. A molding tool can be temporarily connected to the semi-finished product, or the semi-finished product can be inserted into a frame-shaped molding tool, so that the suspension containing gas bubbles can be added into at least one gap between the semi-finished product surface and the inner wall of the particular molding tool so as to be able to create a first volume region there and, directly adjacent thereto, a second volume region as a result of the suspension penetrating into open pores of the semi-finished product.

A molding tool can completely enclose the semi-finished product for this purpose. However, it may also suffice to fix a molding tool to a sub-region of the surface of a semi-finished product, and then add the suspension there into the gap or a cavity between the semi-finished product surface and the molding tool inner wall. In this way, it is possible, for example, to use hollow profiles having a round or an angular cross-section, which can enclose a semi-finished product, as the molding tool. However, it is also possible to use corresponding segments of such profiles, such as circular segments, as the molding tool.

It is possible to carry out the demolding before the thermal treatment is carried out, or else only after sintering has been completed.

The respective penetration depth of the suspension in pores of the semi-finished product, proceeding from the semi-finished product surface, can be influenced by forces acting from the outside, whereby, in turn, the thickness or width of an edge layer region forming the second volume region can be deliberately influenced. The thickness or width should be at least 3 mm, proceeding from the surface of the semi-finished product in the direction of the interior thereof. As was already addressed, this thickness or width can also be selected to be smaller or larger. However, it should be so large that the three volume regions can be joined to one another with sufficient strength, and that a sharp interface between the first and third volume regions can be avoided to as great an extent as possible. The thickness or width required to do so can be based on the cell width or pore size of the semi-finished product and should amount to at least a factor of 3 of the cell size or pore size of the semifinished product.

For this purpose, a semi-finished product by itself, or a semi-finished product having a molding tool attached thereto, can be caused to vibrate and/or a pressure can be exerted on the suspension in the process. In this way, a medium (gas or liquid) that is under increased pressure compared to the ambient pressure can be used, wherein the higher pressure acts on the surface of the suspension, and the suspension is pushed into open pores of the semi-finished product. So as to utilize vibrations for this purpose, a vibrating table can be used, onto which the semi-finished product including the suspension, and possibly at least one molding tool, can be placed. Depending on the amplitude of the vibrations and duration, the width or thickness of the second volume region can be influenced. This can also be achieved by way of a vibrator that engages on a molding tool or a semi-finished product.

It is possible to use a semi-finished product that has a porosity in the range of 60% to 95%, and/or with the suspension a first and/or second volume region can be formed at the component having a porosity in the range of 0% to 55%.

Advantageously, a corrosion-resistance FeCrAl alloy can be used as the metal. Both oxidic and non-oxidic ceramics may be used as the ceramic materials.

A component produced according to the invention comprises a first volume region, which is formed with the metal or the ceramic originating from the suspension. The first volume region has a smaller porosity than the third volume region, which is formed with the open-pored structure of the metallic or ceramic struts of the semi-finished product, wherein the first volume region is exclusively formed with the metal or the ceramic which was obtained from the suspension in which in the gas bubbles were present. The porosity is determined by the number and respective size of the gas bubbles present in the suspension. A second volume region is formed adjacent to this first volume region, which likewise can be porous, but may also be dense. The second volume region is formed with the metal and/or ceramic from the coating of the struts of the semi-finished product and the metal or the ceramic of the suspension, wherein these metals and/or ceramics are joined to one another integrally and in a form-locked manner. As a result, the second volume region is joined to the metallic or ceramic open-pored structure of the open-pored third volume region that was obtained from the coated semi-finished product and has a larger porosity than the first volume region.

The third volume region should have a porosity of at least 65%, and the porosity in the second volume region, which is arranged between the first and third volume regions, should be smaller than in the first and third volume regions of the component.

It is possible for several first and second volume regions to be present at a component, which are arranged spaced apart from one another.

At least with the first volume region, at least one connection for electrical energy, or for supplying and/or removing a medium to and/or from the component, which is accessible from the outside can have been created. In this way, this can represent a connection serving as an electrical contact for an electrical resistance heating element. In the case of an electrical resistance heating element, it is advantageous that a first volume region has sufficiently high strength. The first volume region can be joined to the third volume region via the second volume region in a form-locked and integral manner, and the third volume region can enable improved heating action, in particular due to the large specific surface thereof.

With first and second volume regions, it is also possible to form regions on a component which can perform a dowel function for anchoring elements, such as screws.

When a first and a second volume region are created circumferentially, or at least partially circumferentially around the outer edge of a third volume region, a frame can be formed, in which the open-pored structure can be held and protected in a form-locked and integral manner.

In addition, the invention can also be used for producing components that are used in lightweight construction, automotive engineering, electrical engineering, and in the aerospace field.

The invention is to be described in more detail hereafter based on examples.

EXAMPLE 1

A metal foam plate comprising two compact, rectangular direct foam contacts was produced as follows, serving as the component. To produce the component, a plate in the form of a coarse, rectangular metal foam having the dimensions 125 mm×75 mm×20 mm was used as the semi-finished product. Two first volume regions were to be arranged on two opposing sides so that a square overall shape of the finished component measuring 125 mm×125 mm×20 mm can be obtained. The coarse foam serving as the semi-finished product had a cell width of approximately 4.5 mm and a density of approximately 10% of the metal density of the semi-finished product. The two first volume regions formed solely by way of the suspension reached a sintered density of approximately 50%, and an average pore size between 100 μm and 1500 μm and a porosity of 50% were achieved there.

The coarse foam was produced as the semi-finished product according to the molding method by coating an open-cell polymer foam having a corresponding cell width using the squeezing-calendaring method (Schwartzwalder process). For this purpose, FeCrAl metal powder having a mean particle size of 7 μm was first stirred with a polymeric binder (for example, a polyvinyl preparation, which is commercially available from Zschimmer&Schwarz) and additives (for example, a fatty alcohol preparation, Zschimmer&Schwarz), for defoaming and for adjusting the rheological properties, and with water to yield a suspension having a solids content of metal of approximately 86%. The foamed material was impregnated with this suspension, and the foamed material was squeezed by way of calendaring until the desired loading amount on the strut surfaces of the foam structure was adjusted. The coated and dried foam formed the semi-finished product and was subsequently inserted centrally into a partible molding tool so that an edge having a width of 25 mm remained on both sides between the molding tool inner wall and the semi-finished product surface in regions in which additionally a first volume region was to be created. The forming tool and the semi-finished product were placed onto a vibrating plate.

The suspension with which the first and second volume regions were to be created was produced separately in a batch process. The basis is formed by the same suspension composition made of metal powder, organic binder, and rheological additives, except this time without defoamer.

Instead, up to 5 mass % surfactant (for example, a fatty alcohol sulfate preparation, Zschimmer&Schwarz) was added as a foaming agent. The mixture was foamed over 10 minutes at a rotational speed of 1000 rpm in a beaker, wherein a volume increase of approximately 50% was sought.

The foamed suspension, in which gas bubbles were distributed in the suspension as homogeneously as possible, was subsequently added into the free edge regions between the molding tool inner wall and semi-finished product surface using a spatula. The flow behavior of the suspension thus foamed was adjusted so as to become free-flowing when the molding tool was vibrated lightly by the vibrating plate, but to remain in place when not moved by the action of an external force. In this way, the penetration of suspension containing gas bubbles into pores of the coarse metal foam, which forms the semifinished product, can be controlled, and a combination area of 1 to 2 cell levels (approximately 4.5 mm to 9 mm) can be adjusted as a second volume region. After the edge regions of the semi-finished product in which second volume regions were to be created had been filled, a drying process was carried out over a period of approximately 24 h at approximately 40° C., and the molding tool was able to be removed thereafter. For this purpose, it is recommended to use a molding tool that is composed of several partible individual parts, wherein partible molding tools are generally to be preferred. After the drying process, a debinding step was carried out to remove the organic constituents, and thereafter the metal was sintered. It was possible to produce a component that, on each of two opposing sides, comprises an outwardly directed first volume region, the porosity of which is smaller than the porosity of the third volume region, which was predefined by the porosity of the semifinished product. The second volume region was created between the first and third volume regions, with which the first and third volume regions were joined in a form-locked and integral manner, and the second volume region had no or a smaller porosity than the first volume region. It was possible to create connections for electrical contacting with the first volume regions. All three volume regions were formed using the same metal.

EXAMPLE 2

As an alternative to components made of metal, a ceramic component was to be produced according to the same principle. For this purpose, a water-based ceramic suspension is prepared. This suspension has a bimodal SiC grain size distribution, produced by mixing SiC powders having a mean grain diameter of 0.8 μm and 3.0 μm at a ratio of 70:30, and additionally contains 0.6% boron (carbide) and 11% of a water-soluble polysaccharide (corresponds to 4% carbon after pyrolysis) as a sintering additive. The suspension is adjusted to a solids content of 78%.

To produce the foam ceramic, a polyurethane foamed material having a cell width of 30 ppi (pores per inch) is saturated with the suspension, and thereafter the excess suspension is removed using a centrifuge. A plate measuring 200 mm×250 mm×10 mm shall be mentioned by way of example, which had two rectangular recesses measuring 20 mm×50 mm at the outer edge, arranged symmetrically, and was used as the semi-finished product. A foamed suspension was added to these recesses, which represent a cavity that resembles the interior of a molding tool, so as to create tighter contact connections. The recesses can be introduced into the foam body, for example, by laser or water jet cutting, wherein this should preferably already be carried out prior to the coating process of the polymer foam, during which the semi-finished product is produced.

Otherwise, an at least approximately identical procedure and at least approximately identical consistencies of the semi-finished product and suspension as in Example 1 were adhered to. In contrast to the production of the foamed suspension containing gas bubbles, as was used in Example 1, air in gas bubble form was introduced into the suspension by way of a device, such as is described in DE 10 2010 039 322 A1. The ceramic suspension used for the impregnation of the polymer foams was modified slightly and, in addition to the surfactant, a plasticizer (for example, high polymer polysaccharide, Zschimmer&Schwarz) was added, which improves the processing properties of the suspension with which the first and second volume regions are created. The device comprises a steel hollow cylinder having a length of 182 mm and an outer diameter of 70 mm at a wall thickness of 2.9 mm. This cylinder has a connection for the controllable compressed air supply. At the end face, the tube is provided with a metal disk having a concentric nozzle, which can also serve as a hose connection. The rear of the tube is likewise closed with a metal disk, which has a through-hole having a diameter of 10 mm. A porous hollow cylinder that is clamped between the two lids by sealing rings and has an outer diameter of approximately 25 mm and a wall thickness of approximately 2 mm is situated within the steel cylinder. The porosity of the tube made of stainless steel is approximately 43%. A static mixer of the SMX series (Sulzer Chemtech AG) having a diameter of approximately 20 mm is situated in the core of the tube. The metal powder suspension is conducted through this porous inner tube with the static mixer, while at the same time being subjected to a pressure of approximately 0.3 MPa by way of the compressed air and an air volume flow of approximately 600 ml/min. As a result, uniform air bubbles are created in the suspension.

The suspension thus foamed can be added into the recesses, which were already created in advance on the semi-finished product, by switching the foaming device on and off. The thickness of the edge region forming the second volume region should be approximately 4 mm so as to achieve a form-locked and integral joint between the second and third volume regions subsequent to the sintering process.

Thereafter, gentle drying is carried out in a drying cabinet at 40° C. over at least 12 h. After drying, the polymer foam in the interior of the struts of volume 1 is burned off at a temperature of 800° C. under an inert gas atmosphere. The remaining SiC powder scaffold is sintered in a depressurized environment under an argon atmosphere at a temperature of 2100° C., whereby a component made of SiC according to the invention is obtained.

The invention claimed is:

1. A method for producing a porous metallic and/or ceramic component, which comprises at least three mutually adjoining volume regions having differing porosities, in which an open-pored foam body, which is formed of a polymeric material, is provided with a metallic coating or a coating formed with metallic or ceramic particles at the surfaces of struts of the foam body in such a way that an open-pored base structure is preserved to form a semi-finished product; and a suspension, which is formed with metallic or ceramic particles, a liquid, a polymeric binder and additionally previously formed gas bubbles is brought in contact with the surface of the semi-finished product, creating a predefined shape at predefined surface regions of the semi-finished product, with a portion of this suspension penetrating the open pores of the semi-finished product, in an edge layer region; and thereafter, a drying process using a thermal treatment is carried out, during which liquid contained in the suspension is expelled, the polymeric binder is removed, and subsequently a sintering process is carried out, wherein during sintering, a first volume region being formed with the metallic or ceramic particles originating from the suspension, which has a smaller porosity that was exclusively obtained as a result of the gas bubbles present in the suspension, and, adjoining this first volume region, a second volume region is created, which is likewise porous, and the second volume region has been formed with the metallic or ceramic particles from the coating of the struts of the semi-finished product and the metallic or ceramic particles of the suspension, these metallic or ceramic particles having been joined to one another integrally and in a form-fitting manner within the second volume region, and thereby the second volume region being joined to a metallic or ceramic open-pored structure of an open-pored third volume region that was obtained from the coated foam body and has a larger porosity than the first volume region.

2. The method according to claim 1, wherein the foam body formed with the polymeric material, for creating the semi-finished product, is coated at the struts thereof with metal by means of a CVD method, PVD method, galvanically or with a suspension containing metallic or ceramic particles, the semi-finished product obtained by coating with a suspension being dried prior to having the suspension applied thereto for creating the first and second volume regions so that sufficiently high green strength is achieved to ensure that the coated struts have sufficient strength to avoid damage when a surface region is brought in contact with the suspension containing gas bubbles.

3. The method according to claim 1, wherein the struts of the semi-finished product are coated with the same metallic or ceramic particles which were used to form the suspension for creating the first and second volume regions.

4. The method according to claim 1, wherein a suspension which has a viscosity of at least 0.1 mPas and/or in which gas bubbles are present, having a volume percentage of at least 5% up to a maximum of 50% of the total volume of the suspension, is used for creating the first and second volume regions.

5. The method according to claim 1, wherein the suspension is added into at least one recess, depression, or perforation that is formed on the semi-finished product, and/or into the interior of a molding tool that can be attached to the particular semi-finished product, for creating the first and second volume regions.

6. The method according to claim 1, wherein a penetration depth of the suspension in pores of the semi-finished product, proceeding from the semi-finished product surface, is influenced by forces acting from outside of the suspension.

7. The method according to claim 1, wherein the semi-finished product by itself, or a semi-finished product having a molding tool attached thereto, is caused to vibrate and/or a pressure is exerted on the suspension.

8. The method according to claim 1, wherein the semi-finished product is used, which has a porosity in the range of 60% to 95% and/or that a first and/or second volume region is created with the suspension at the component having a porosity in the range of 0% to 55%.

9. The method according to claim 1, wherein the metallic particles used are an FeCrAl alloy.

10. The porous metallic and/or ceramic component, produced using a method according to claim 1, wherein the first volume region is formed with the metallic or ceramic particles originating from the suspension, which has a smaller porosity that was exclusively obtained as a result of the gas bubbles present in the suspension, and, adjoining this first volume region, the second volume region is created, which is porous, and the second volume region is formed with the metallic and/or ceramic particles from the coating of the struts of the semi-finished product and the metallic and/or ceramic particles of the suspension, with these metallic and/or ceramic particles being joined to one another integrally and in a form-fitting manner, and thereby the second volume region being joined to the metallic or ceramic open-pored structure of the semi-finished product, which has a larger porosity than the first volume region.

11. The component according to claim 10, wherein the third volume region has a porosity of at least 65%, and the porosity in the second volume region, which is arranged between the first and third volume regions, is smaller than in the first and third volume regions.

12. The component according to claim 10, wherein at least with the first volume region, at least one connection for electrical energy, is created.

13. The component according to claim 10, wherein a plurality of first and second volume regions, which are arranged spaced apart from one another, are present.

14. The component according to claim 10, wherein the third volume region has a porosity in the range of 80% to 93%.

* * * * *